Patented Dec. 27, 1938

2,141,611

UNITED STATES PATENT OFFICE 2,141,611

METHOD OF ALKYLATING CYCLIC COMPOUNDS

Boris Malishev, Berkeley, Calif., assignor to Shell Development Company, San Francisco, Calif., a corporation of Delaware No Drawing. Application December 2, 1933, Serial No. 700,752

5 Claims. (Cl. 260—671)

This invention relates to the treatment of organic compounds for converting them by means of phosphorus pentoxide into substances having boiling temperatures higher than those of the initial compounds and is particularly directed to the method for the manufacture of synthetic hydrocarbonaceous materials from unsaturated and/or substituted hydrocarbons, such as alkyl and aralkyl halides or mercaptans by condensing them with cyclic compounds which may be carbocyclic or heterocyclic.

It is the object of this invention to provide means for introducing organic side chains into cyclic nuclei.

While a large number of agents are known to possess the property of promoting the condensation of unsaturated hydrocarbons, or of unsaturated hydrocarbons with aromatic hydrocarbons, such, for example, as concentrated sulfuric acid, anhydrous $AlCl_3$, etc., their use normally involves certain difficulties (formation of objectionable sludges, rapid exhaustion of the contact agent, etc.), which make practical applications of the methods employing such agents quite unattractive and sometimes entirely prohibitive.

I have discovered that under certain temperature and pressure conditions anhydrous phosphorous pentoxide ($P_2O_5$) exhibits excellent catalytic activity when present in a mixture of certain organic substances, especially hydrocarbons. This catalytic activity of phosphorus pentoxide is peculiar in that when this substance is present in a mixture of unsaturated organic compounds and aromatic hydrocarbons the speed of mutual polymerization of the unsaturated compounds is far slower than the speed of catalytic condensation of unsaturated compounds with aromatic hydrocarbons, so that the introduction of side chains into the carbocyclic nuclei (alkylation) takes place in preference to polymerization among olefines, for example, and without accompanying substantial polymerization of olefines. Suitable cyclic compounds are the well known mono- and polycyclic compounds, as benzene, naphthalene, anthracene and their homologues, etc., termed aromatic compounds, all of which may be further substituted.

Some of the heterocyclic organic compounds, such as analogues and/or homologues of pyridine, quinoline and thiophenes may also be looked upon as having cyclic nuclei capable of being alkylated by the method of this invention.

Suitable unsaturated compounds comprise secondary and tertiary olefines, diolefines, acetylene, or other organic compounds capable of direct addition of halogen, such as unsaturated ethers, ketones, aldehydes, organic acid anhydrides, their mixtures, solutions, suspensions, emulsions, etc. In lieu thereof one may employ saturated and/or unsaturated aliphatic or aralkyl halides, or mercaptans of any character.

I have found that phosphorus pentoxide, while being an active polymerizing catalyst, is not corrosive, does not form objectionable reaction by-products and its activity can be conveniently controlled.

My process renders itself as a highly useful means for preparing synthetic products, such as high grade motor fuels, by condensing aromatic hydrocarbons, such as benzene, toluene or its homologues, etc., with substantially pure olefines, such as ethylene, propylene, butylene, amylene, etc., singly or combined, or with comparatively complex mixtures, such as cracked distillates or cracked vapors or gases or with hydrocarbon fractions predominantly comprising olefines containing the same number of carbon atoms to the molecule. It may also be used for preparing substantially pure chemical compounds.

While the process of this invention may be used for treating vapors, comprising cyclic and unsaturated organic compounds, by passing them through a mass of $P_2O_5$ supported on a suitable carrier, I prefer to practice my treating method by suspending a quantity of finely divided $P_2O_5$ in a liquid, which may be the mixture to be treated, containing said organic compounds; or $P_2O_5$ may be suspended in a liquid which is one of the substances to be treated, such as a mixture of cyclic compounds, while the other, such as olefines, is introduced in vapor state into this $P_2O_5$ suspension and thus caused to react with the liquid substance. In another alternative form of my invention I may suspend $P_2O_5$ in an auxiliary liquid which may or may not take part in the reaction promoted by $P_2O_5$, but whose purpose is to serve as a carrier for $P_2O_5$; the reacting substances, which may be olefines and aromatic hydrocarbons, are then introduced into the suspension and are caused to react by applying heat and pressure to the mixture; as an auxiliary liquid I prefer to employ one which acts as a solvent for the reacting substances and which may or may not be readily separated from the reaction product. Gasoline, kerosene or stove oil may be used, for example, in treating light olefines, aromatic hydrocarbons, or their mixtures, or cracked vapors or gases, for production of synthetic gasoline or lubricating oils, or other products.

Although it is possible to effect the alkylation of cyclic organic compounds, by using $P_2O_5$ alone as catalyst, I have found that similarly to my process described in the Patent No. 1,914,953, it is advantageous, when suspending $P_2O_5$ in a liquid, to employ supplemental refining agents, apparently having peptizing effect on the $P_2O_5$ suspension. Among such supplemental refining agents may be mentioned oxidized mineral oils or bitumens, such as asphalt, coal tar pitch, wood tar pitch, hardwood pitch, etc., which contain organic oxy compounds, also aldehydes, ketones and salts of organic acids, comprising such compounds as benzophenone, copper oleate, copper acetate, copper naphthenate, aromatic nitro-compounds, etc. In lieu or in conjunction with the aforementioned supplemental refining agents may be used metallic halides, such as $CuCl_2$, $Fe_3$, $SbCl_2$, etc.

I have also found that in order to stabilize $P_2O_5$ suspensions which may or may not contain supplemental refining agents mentioned above, it is very beneficial to incorporate into these suspensions a relatively small quantity of a stabilizing agent having the effect of a protective colloid; among such agents are lamp black, fuller's earth, finely divided silica, etc.

In carrying out my invention in practice, I operate my process within the temperature range of 150–300° C., or thereabouts, and under moderate pressures usually not exceeding about 50 atmospheres gauge (about 750 lbs./sq. in.) although higher pressures may be employed. The general rule applicable in the reactions of this type, that an increase either in the reaction temperature or in pressure, or in the concentration of the catalyst, favors the polymerizing activity of a catalyst, provides a variety of means for regulating the progress of polymerization of unsaturated hydrocarbons or substitute derivatives. The following illustrative examples are intended to demonstrate more specifically some of the applications of this invention:

I. A stream of ethylene was introduced, under a pressure of about 27 atmospheres gauge (400 lbs./sq. in.), into a mixture of 50 gms. of $P_2O_5$, 25 gms. lamp black, 100 gms. cresol and 780 gms. of benzene. The temperature of the reacting mixture was maintained at about 250° C. for 15 minutes, while stirring. The obtained products were:

| | Percent by volume |
|---|---|
| Unreacted benzene | 1.6 |
| Monoethyl benzene | 23.1 |
| Isomers of diethyl benzene | 42.3 |
| Isomers of triethyl benzene | 24.4 |
| Isomers of tetra and higher ethyl benzenes | 8.5 |
| | 99.9 |

It is of particular interest that no appreciable polymerization within olefines took place.

II. 300 gms. of liquid isobutylene were added to a mixture of 50 gms. of $P_2O_5$, 25 gms. lamp black, 10 gms. cresol, and 780 gms. of benzene. The mixture was heated, while stirring, at about 250° C. for 15 minutes, and the following products were obtained:

| | Percent by volume |
|---|---|
| Unreacted isobutylene | 3.3 |
| Unreacted benzene | 20.7 |
| Monobutyl benzene | 47.9 |
| Dibutyl benzene | 17.0 |
| Higher butyl benzenes | 11.0 |
| | 99.9 |

III. A stream of ethylene was introduced under a pressure of 40 atmospheres into a mixture of 40 gms. $P_2O_5$, 20 gms. lamp black, 5 gms. cresol and 828 gms. Borneo light distillate high in aromatic hydrocarbons. The temperature of the reacting mixture was maintained at about 225° C. for 15 minutes while stirring. The increase of liquid products due to polymerization of ethylene with aromatics was 20%. The liquid on distillation gave a colorless, sweet motor fuel and an oil with a viscosity in the range of lubricating oils.

IV. 250 cc. of cracked distillate which analyzed about 80% olefines and boiled between 40 and 87° C. was mixed with 250 cc. of benzene, 25 gms. $P_2O_5$, 15 gms. lamp black and 3 gms. cresol. The temperature of the reacting mixture was maintained at about 225° C. for 15 minutes while stirring. The product obtained gave on distillation 400 cc. of a 225° C. end point gasoline of excellent qualities and high anti-knock value and 50 cc. of a lubricating oil having viscosity of a cylinder oil.

V. A lubricating oil was treated with benzene and $P_2O_5$ in the manner described in Example IV. The gum and sludge forming olefines and unsaturated hydrocarbons were thus converted into stable hydrocarbons. Such a product is then valuable for the manufacture of oils with high resistance against sludging and oxidation, as for instance is required for transformers and turbines.

VI. A lubricating oil was treated was $P_2O_5$ and ethylene in the manner described in Example III. The condensation of ethylene and aromatics formed alkylated products with flatter viscosity-temperature curve. The resulting oil therefore was found to have improved viscosity-temperature curve as expressed by a higher viscosity index according to Dean and Davis.

VII. A mixture of 160 gms. ethyl mercaptans, 250 gms. benzene, 25 gms. $P_2O_5$, 10 gms. lamp black and 0.5 cc. of cresol was heated for two hours at 300° C. in an autoclave under pressure. The treated product was distilled and 35 gms. of monoethyl benzene obtained according to the reaction $$C_6H_6 + C_2H_5.SH = C_6H_5.C_2H_5 + H_2S$$

The process of this invention may be carried out in a batch, intermittent or continuous manner, for example, by maintaining a continuous stream of a suspension of a catalytic mass containing anhydrous $P_2O_5$ in a suitable liquid medium, such as aromatic hydrocarbons, and maintaining a continuous stream of a hydrocarbon mixture containing olefines, contacting and intermingling the two streams in regulated proportion and, or while, passing the commingled streams at a regulated rate through a zone maintained under conditions of reaction temperature and pressure, separating the products of reaction from the catalytic mass, supplying fresh hydrocarbons to be treated to the reaction zone and recycling at least a portion of the recovered catalytic mass through the reaction zone. Countercurrent or concurrent contact of the materials may be resorted to either in the vapor, liquid or mixed phases.

The process is carried out in a substantially anhydrous system so as to avoid any unnecessary loss of $P_2O_5$.

While I have in the foregoing described in some detail the prefered embodiment of my invention and some variants thereof, it will be understood that this is only for the purpose of making the invention more clear and that the invention is not to be regarded as limited to the details of operation described, nor is it dependent upon the soundness of accuracy of the theories which I have advanced as to the reasons for the advantageous results attained.

I claim as my invention:

1. In the process for introducing a side chain into the nucleus of a cyclic compound capable of being alkylated, the steps comprising adding to the cyclic compound a cracked gasoline distillate consisting predominantly of olefins, and reacting the resulting mixture with substantialy anhydrous $P_2O_5$ at a temperature between about 150° to 300° C.

2. In the process of alkylating aromatic hydrocarbons the steps of introducing a normally gaseous olefine under superatmospheric pressure into an aromatic hydrocarbon, and reacting the resulting mixture with substantially anhydrous $P_2O_5$ at a temperature between 150° and 300° C.

3. In the process of producing ethyl benzene the steps of introducing ethylene into benzene under superatmospheric pressure and reacting the resulting mixture with substantially anhydrous $P_2O_5$ at a temperature between 150° and 300° C.

4. In the process of treating a hydrocarbon oil containing members of the group consisting of cyclic hydrocarbons capable of alkylation and olefins, said members being capable of reacting with each other in the presence of an alkylating reagent under alkylating conditions, one of said members being present in an amount insufficient appreciably to react with the other, the steps comprising adding a substantial quantity of the other member to the said oil and reacting the resulting mixture with substantially anhydrous $P_2O_5$ at a temperature between about 150° to 300° C.

5. In the process of introducing a side chain into the nucleus of a cyclic compound capable of being alkylated, the steps of adding to the cyclic compound another compound containing an olefinic double bond, and reacting the resulting mixture with substantially anhydrous $P_2O_5$ at a temperature between about 150° to 300° C.

BORIS MALISHEV.